Patented Jan. 30, 1951

2,539,928

UNITED STATES PATENT OFFICE 2,539,928

WOOL CHROME DYESTUFF

David I. Randall, Easton, Pa., and Edgar E. Renfrew, Phillipsburg, N. J., assignors to General Aniline & Film Corporation, New York, N. Y., a corporation of Delaware No Drawing. Application December 10, 1949, Serial No. 132,392

2 Claims. (Cl. 260—373)

This invention relates to a new and valuable dyestuff of the anthraquinone series which yields attractive blue-green shades upon after-chroming on wool.

The dyestuff of the present invention has the following formula:

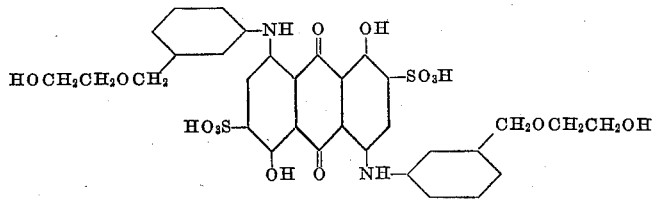

It is formed from the reaction of 4,8-dibromoanthrarufin-2,6-disulfonic acid with 2-m-aminobenzyloxyethanol. It yields upon after-chroming on wool attractive blue-green shades which are especially fast to washing and fulling and more particularly to fulling.

The following example illustrates preferred embodiments of the invention but it will be understood that variations and modifications may be made within the scope of the claims.

Example

In a suitable vessel was placed 27.9 parts by weight 4,8 - dibromoanthrarufin - 2,6 - disulfonic acid, 23.0 parts 2-m-aminobenzyloxyethanol, 21.2 parts sodium carbonate, 1.5 parts cuprous chloride, 0.5 part finely divided copper and 980.0 parts water. The mixture was maintained at 60–70° C. for thirty hours, during which time it was stirred. The mixture was diluted to double its original volume, warmed to 80° C., and filtered. To the hot filtrate was added 200 parts sodium chloride; on cooling, a solid deposited which was removed by filtration. This cake was reprecipitated twice more from approximately 10% brine and once from 5% brine. After the final filtration the cake was washed with 2% salt solution and dried. It weighed 31 parts. Dyeings of this product on wool yielded an attractive blue green shade after chroming of very good fastness to fulling. Chroming was in the usual manner using potassium bichromate. The reaction may be represented as follows:

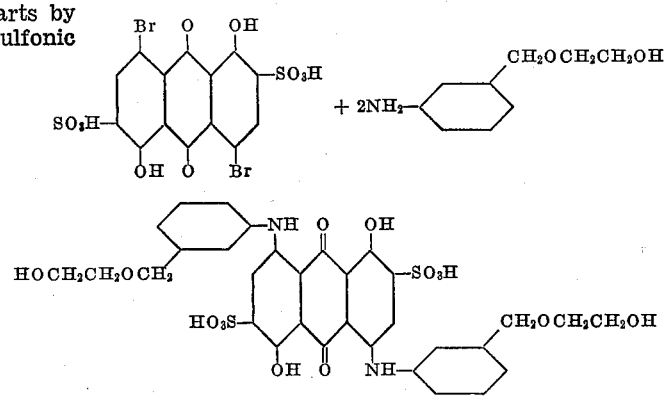

We claim:
1. A new dyestuff of the formula:

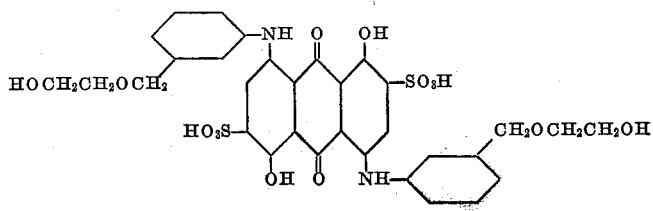

2. A method for preparing a new dyestuff of the formula:
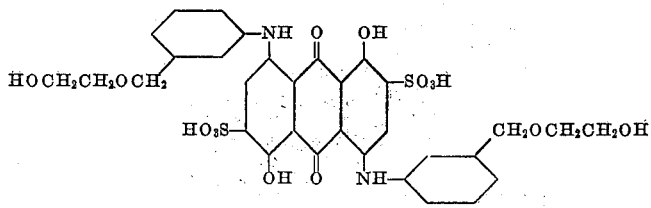
which comprises reacting 4,8-dibromoanthrarufin-2,6-disulfonic acid with 2-m-aminobenzyloxy-ethanol.
DAVID I. RANDALL.
EDGAR E. RENFREW.
No references cited.